Patented Feb. 8, 1944

2,340,946

UNITED STATES PATENT OFFICE 2,340,946

QUICK-DRYING PRINTING INK

Carleton Ellis, Montclair, N. J., assignor, by mesne assignments, to Jasco, Incorporated, a corporation of Louisiana No Drawing. Application July 16, 1940, Serial No. 345,853

5 Claims. (Cl. 260—28)

This invention relates to printing inks and particularly to those printing inks of the quick-drying type.

The usual type of printing ink contains a pigment, a binding agent, a liquid thinner or vehicle and various modifying agents such as color extenders, soaps, waxes, pitches and the like. When a drying oil, such as linseed oil, tung oil or perilla oil, is used as a binding agent, the drying time of the ink is relatively long. As a consequence of the long drying period of inks containing such oils, said inks cannot be used on high speed presses. Driers or drying agents are frequently added to the last mentioned inks to hasten drying of the oil contained therein. Although the time necessary for drying of the ink is markedly decreased by the drying agent, drying is still a lengthy process.

Another class of liquid ink used for newspaper printing and other work, wherein the paper employed is absorbent, has a vehicle containing a large percentage of mineral oil. This ink dries by absorption of the mineral oil into the paper. Inks of the latter class cannot be used on calendered or glossy paper, and on absorbent paper or textiles have deficiencies of spreading, showing through, and forming impressions with fuzzy outlines.

To reduce the time of drying of inks and to make better imprints the quick-drying type has been developed. Ordinarily a readily volatile solvent and a gum or resin binder along with the other constituents, such as pigments and modifiers, constitute a quick-drying ink. To effect drying of the volatile portions of the ink, the print may be subjected to slightly elevated temperatures. In some instances, the ink preferably is free of normally liquid ingredients or volatile solvents, being applied in a softened condition, then solidified or set upon cooling.

One object of my invention is to provide a printing ink applicable to typogrpahic or intaglio processes, which will dry or harden on brief exposure to elevated temperatures, or which can be rapidly set on the surface of paper or textiles at reduced temperatures.

Another object of my invention is to provide a quick-drying ink having a binding agent comprising polymeric olefinic petroleum hydrocarbon or hydrocarbons.

Another object of my invention is to provide a quick-drying printing ink containing a polymeric olefinic binding agent and a defeathering agent therefor.

A still further object is to provide an ink that is inert toward ordinary atmospheric influences, e. g., oxidation or moisture, and will thereby be durable.

Still another object is to provide a flexible, glossy ink that will not tend to crack or disintegrate when bent or distorted in any manner. Other objects will be apparent to those skilled in the art.

I have observed that high-molecular weight hydrocarbons, particularly substantially saturated linear polymeric hydrocarbons resulting from the polymerization, copolymerization or condensation of olefinic compounds are particularly applicable as binding agents for quick-drying printing inks. By high-molecular weight I means those compounds having a molecular weight higher than 30,000, and preferably above 40,000. By polymerization I mean the uniting or interacting of molecules of an individual olefinic hydrocarbon, i. e., a low-molecular weight hydrocarbon having only one double bond and less than 6 carbon atoms per molecule, to furnish materials of sufficiently high-molecular weights to be suitable for my purpose. These products are soluble in certain petroleum fractions, lower polymeric olefins, e. g., dimer of isobutylene, and many other organic compounds. They are characterized as saturated and linear in that the combined units of the olefin molecules form a long chain of carbon atoms joined together almost entirely by single bonds. For improved compatibility with hydrocarbon solvents, they are branched linear polymers, such as those obtained from iso-olefins.

In their use as ingredients of quick-drying or rapid setting inks, the polymerized olefin hydrocarbons are found to be of little value and even detrimental unless they co-act with other ink ingredients to rapidly form at the surface of the stock that is printed, a tough, dry, thin film in the form of the impression desired. This requires that the ingredients of the ink hold suitably high amounts of pigment uniformly distributed in suspension, and that the ink adhere firmly to the material receiving the print without discoloration or "show through." The polymers of molecular weights exceeding 30,000 form a pigment vehicle which remains clear and colorless and which co-acts satisfactorily with other ink ingredients, while on the other hand, lower molecular weight polymers, not sufficiently low boiling to be removed by vaporization, remain sticky, cause tearing of fibers in the printing operation, have a spreading tendency, and leave a printed surface which is tacky and readily smudged.

These olefin polymers of substantially saturated character are resistant to oxidation so that they cannot be hardened by driers.

An example of such a material which is particularly useful for my purpose is polymerized isobutylene. The olefin is treated at temperatures below −40° F. with a catalyst, e. g., boron trifluoride, and a polymeric product is obtained having a molecular weight above 30,000. It is important that the polymerized product have a molecular weight above 30,000; otherwise the polymer is sticky, thereby causing the printed sheets to adhere to one another. A polymer prepared as described is very light in color and consequently is useful in compounding of light-colored inks.

In preparing inks, according to this invention, preferably the polymeric olefin or mixture of polymeric olefins is dissolved in a suitable solvent. A petroleum fraction boiling between 300 and 400° F. is applicable as a solvent. A pigment such as carbon black is dispersed in the solution of the polymer. The ratio of binder to pigment may vary over wide limits; a ratio of equal parts is satisfactory. The amount of solvent should be about three times as great as the total solids (pigment plus binder), although greater or lesser amounts may be used to obtain ink of a desired consistency. Other substances such as other resins, gums, soaps, pitch, wax or defeathering agents may be added to change the characteristics of the ink.

Other solvents that have been found appropriate for use with polymeric olefins are chlorinated hydrocarbons, the lower polymeric olefins such as the dimer or trimer of isobutylene and many other organic solvents. The important feature that each solvent must have is a volatility that is not so great that the ink would thicken on the rolls, but on the other hand, the solvent should be volatile enough so that at 300° F. to 450° F. it is sufficiently removed in a few seconds so that the ink is not tacky and will not smudge.

Sometimes "feathering" is encountered when polymeric olefin binders are used in quick-drying printing inks. By this is meant that phenomena observed during the printing operation which is characterized by a tendency of the ink to stick to both the paper and the type and, in so doing, the ink forms threads as the paper is withdrawn from the type. These threads break and may cause smudges on the paper or unevenness of the printed form. When necessary this undesirable feature may be overcome by incorporating into the ink composition a liquid oxygenated hydrocarbon. The decyl alcohols, acetone oil and the esters of lactic acid when mixed with the ink composition reduce feathering to a very marked extent and are designated in this specification as defeathering agents.

The following examples will further illustrate my invention, but I do not wish to be limited to the specific compounds disclosed or the proportions of ingredients used. The latter may be varied over a wide range without harming the useful qualities of the ink.

*Example 1*

Two parts of highly polymerized isobutylene (a rubbery solid of molecular weight above 40,000) were dissolved in 6 parts of a petroleum fraction boiling between 300° F. and 400° F. The solution was thinned with 4 parts of a petroleum fraction (boiling from 350° F. to 450° F.) and then three parts carbon black incorporated by grinding. The composition thus obtained was somewhat viscous and may be thinned to any desired consistency depending upon the printing process in which it is to be used. A thin film of the ink on paper dried in less than a minute at 266° F. At slightly higher temperatures the drying was considerably more rapid.

*Example 2*

Two parts of a polymeric olefin (having a molecular weight of about 80,000) were dissolved in 6.5 parts of a petroleum distillate and then 1 part of secondary decyl alcohol added. A red pigment was incorporated to the extent of 0.8 part, into the preceding solution. This ink exhibited good flowing qualities and a thin film on paper dried rapidly at 266° F.

*Example 3*

Two parts of a polymeric isobutylene and 0.5 part of ester gum were dissolved in 10 parts of a petroleum distillate boiling between 300° F. and 400° F. One part of Prussian blue and 2.5 parts of carbon black were incorporated with the solution. The resulting ink composition dried in a few seconds at 284° F.

*Example 4*

To a solution consisting of 9 parts of a petroleum distillate (boiling between 300° F. and 400° F.) and 2 parts of polymeric isobutylene material were added 2 parts of acetone oil (boiling between 185° F. and 383° F.). Into the liquid mixture were ground 2.5 parts carbon black. This composition was a short ink having good body and consistency. When printed on paper the ink film dried very quickly at 284° F.

*Example 5*

One and one-half parts of polymeric isobutylene (molecular weight about 30,000) were dissolved in 4.5 parts of o-dichlorobenzene. A solution of 1.5 parts of ethyl cellulose in 6 parts of the same solvent was prepared. Six parts of the first solution were added to 7.5 parts of the second solution, and then 0.2 part of ceresin wax and 0.1 part of carnauba wax dissolved in the mixed solutions. One and one-half parts of yellow pigment and 1.5 parts of hydrated alumina oxide were incorporated. The resulting ink had excellent flow and body characteristics and when spread on paper dried rapidly at 311° F.

*Example 6*

Polymerized isobutylene material (1.75 parts) was dissolved in 5.25 parts of a petroleum distillate (boiling between 300° F. and 400° F.). Oil-soluble sulphonate soaps (0.65 part), derived from a sulphuric acid-treated petroleum fraction, were dissolved in monochlorobenzene (0.80 part). The two liquid compositions were mixed in ratio of 7 parts of the hydrocarbon solution to 1.45 parts of the monochlorobenzene composition. Afterwards, 1.8 parts of carbon black, 0.3 part of Prussian blue and 1.5 parts of acetone oil (boiling from 185° F. to 383° F.) were incorporated into the liquid mixture. This ink exhibited good flowing qualities, and a thin film of it (on paper) dried quickly at 302° F.

*Example 7*

Another sample of high-molecular weight polymeric isobutylene material, which was a relatively stiff, less fluid, semi-solid, elastic mass at room temperature, was characterized by its effect on the viscosity of petroleum lubricating oil. In this instance it was noted that on dissolving 3 per cent of the polymeric isobutylene in the oil the viscosity (Saybolt) of the latter at 100° F. increased from 201 seconds to 897 seconds, and at 210° F. from 46.4 seconds to 115 seconds. Portions of this more highly polymerized olefin were employed in preparing the compositions described in Example 8.

*Example 8*

One part of polymeric isobutylene material was dissolved in 9 parts of sym.-tetrachloroethane. A solution of 0.2 part of ethyl cellulose in 5 parts of the same solvent was prepared. The two solutions (in the ratio of 10 parts of the former to 5.2 parts of the latter) were mixed, and then 2 parts of carbon black were incorporated into the liquid mixture by grinding. The resulting composition exhibited good flow, body and consistency, but feathered excessively when employed in printing operations. This undesirable feature was eliminated by thoroughly grinding the ink composition with 1.3 parts of ethyl lactate. After addition of the lactate the ink, in the form of thin films on paper, dried in a few seconds at 266° F.

Although my invention has been exemplified with highly polymerized isobutylene material, other polymeric olefins or mixtures of olefins are equally applicable, if they are analogously substantially saturated linear type polymers, and more particularly branched linear polymers with no more than one double bond on the average in a chain of at least about 200 carbon atoms. The important features that any polymerized material useful in my invention should have is a molecular weight sufficiently high so that the said polymer is substantially free of tackiness at ordinary temperatures. Although I have specified polymers of high molecular weight as binders, I do not wish to exclude those polymers, e. g., diisobutylene, triisobutylene, or tetraisobutylene, which may be used as solvents for the more highly polymerized olefins.

Drying of inks, made according to my invention, has been illustrated by heating, for short periods of time, thin films of the ink on paper. Higher temperatures than those shown may be used and, consequently, more rapid drying will take place. A cooling operation may also follow this heating operation to set more quickly the heated print.

Solvents are limited only by their volatility. Those too volatile are to be avoided in typographic work but may readily be advantageous when the ink is used in intaglio processes. On the other hand the solvent should never have so high a boiling point or low volatility that the ink will require either excessively lengthy heating periods or high temperatures to effect drying of said ink.

Various modifying agents have been illustrated. These are but a small portion of addition agents which could readily be used.

The pigments may be of most any color as the polymers used are colorless, or nearly so. Because of this feature, the amount of pigment necessary to produce the desired intensity in color is small when compared to that necessary in inks using any of the more common natural or synthetic resin binders, which have colors ranging from yellow to black.

It is understood, of course, that the consistency of the ink is more or less directly proportionate to the type and amount of solvent used so that a buttery ink may contain the same ingredients as a free-flowing rotogravure ink, the only difference being in the proportion of constituents. For instance, the ink comprising the high molecular weight polymers, e. g., with molecular weights ranging from 40,000 to about 100,000, may be applied in softened or molten form substantially free of solvents or normally liquid ingredients and be rapidly set by lowering the temperature of the fresh print. In this type of ink the polymer is advisably improved by addition of a thermoplastic substance, such as wax, as for example, mineral waxes having melting points above 110° F.

What I claim is:

1. A quick-drying printing ink composition comprising a pigment; a normally solid binding agent, said binding agent being normally resistant to oxidation, and being a relatively non-tacky, normally solid, substantially saturated linear polymerized olefin hydrocarbon of average molecular weight greater than 30,000 co-acting rapidly with other ingredients of said ink composition to form upon use a tough, dry, thin film; a liquid oxygenated hydrocarbon of the class consisting of secondary decyl alcohol, ethyl lactate and acetone oil boiling between 185° F. and 383° F., which blend in the composition to prevent tendency of said ink to stick to both paper and type; and a liquid solvent for said binding agent and dispersion of said pigment; and said liquid oxygenated hydrocarbon and said liquid solvent also being characterized by rapidly vaporizing from the ink composition at a temperature from about 265° F. to about 300° F. to leave a thin film of said pigment and said binding agent on stock being treated.

2. A quick-drying printing ink composition according to claim 1, in which the binding agent is copolymerized olefinic hydrocarbons containing less than one double bond on the average in a chain of 200 carbon atoms.

3. A quick-drying printing ink composition according to claim 1, in which the binding agent is polymerized isobutylene having an average molecular weight greater than 30,000.

4. A printing ink which dries rapidly upon use in a thin film at a temperature from about 265° F. to about 300° F. comprising a pigment; a normally solid pigment vehicle, said normally solid pigment vehicle being substantially a relatively non-tacky, substantially saturated, linear, polymerized hydrocarbon of average molecular weight greater than 40,000 formed from mono-olefins of less than six carbon atoms in the molecule, which co-acts rapidly with other ingredients of said ink composition to form upon use a tough, dry, thin, film; a liquid oxygenated hydrocarbon of the class consisting of secondary decyl alcohol, ethyl lactate and acetone oil boiling between 185° F. and 383° F. which blend in the composition to prevent tendency of said ink to stick to both paper and type; and a liquid solvent for said normally solid pigment vehicle and dispersion of said pigment; said liquid oxygenated hydrocarbon and said liquid solvent also being characterized by rapidly vaporizing from the ink composition at a temperature from about 265° F. to about 300° F. to leave a thin film of said pigment and said pigment vehicle on stock being printed.

5. A printing ink according to claim 4 in which said pigment vehicle comprises in addition to said polymerized hydrocarbon a normally solid wax.

CARLETON ELLIS.